US012800925B2

(12) United States Patent
Ha et al.

(10) Patent No.: US 12,800,925 B2
(45) Date of Patent: Nov. 17, 2026

(54) OPTICAL DEVICE FOR AUGMENTED REALITY USING TOTAL INTERNAL REFLECTION

(71) Applicant: LETINAR CO., LTD, Anyang-si (KR)

(72) Inventors: Jeong Hun Ha, Seoul (KR); Jin Ho Jung, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 804 days.

(21) Appl. No.: 17/788,880

(22) PCT Filed: Jan. 7, 2021

(86) PCT No.: PCT/KR2021/000214
§ 371 (c)(1),
(2) Date: Jun. 24, 2022

(87) PCT Pub. No.: WO2021/141420
PCT Pub. Date: Jul. 15, 2021

(65) Prior Publication Data

US 2023/0023525 A1 Jan. 26, 2023

(30) Foreign Application Priority Data

Jan. 8, 2020 (KR) ........................ 10-2020-0002457
Jan. 7, 2021 (KR) ........................ 10-2021-0001818

(51) Int. Cl.
*G02B 27/00* (2006.01)
*G02B 27/01* (2006.01)

(52) U.S. Cl.
CPC .. *G02B 27/0172* (2013.01); *G02B 2027/0127* (2013.01)

(58) Field of Classification Search
CPC ........ G02B 27/0172; G02B 2027/0127; G02B 7/18; G02B 2027/015; G02B 1/06;
(Continued)

(56) References Cited

U.S. PATENT DOCUMENTS 7,019,909 B2 * 3/2006 Yamazaki ............ G02B 17/004
359/732
10,146,054 B2 * 12/2018 Martinez .................. G02C 7/02
(Continued)

FOREIGN PATENT DOCUMENTS

CN 101004483 A 7/2007
CN 102004317 A 4/2011
(Continued)

*Primary Examiner* — Henry Duong
(74) *Attorney, Agent, or Firm* — Rabin & Berdo, P.C.

(57) ABSTRACT

The present invention is directed to an optical device for augmented reality using total internal reflection, the optical device including: an optical means for transmitting at least part of real object image light toward the pupil of an eye of a user; wherein a total internal reflection space configured to transfer augmented reality image light, output from an image output unit, toward the pupil of the eye of the user is formed inside the optical means; and wherein the total internal reflection space is filled with a medium having an index of refraction lower than the index of refraction of the optical means, and the augmented reality image light transferred to the total internal reflection space through the inside of the optical means is reflected by total internal reflection on the total internal reflection space and then transferred toward the pupil of the eye of the user.

12 Claims, 7 Drawing Sheets

(58) Field of Classification Search
CPC .............. G02B 3/08; G02B 2027/0152; G02B 2027/0178; G02B 27/0093; G02B 26/08; G02B 26/10; G06V 40/18; G02F 1/29
USPC .......................................................... 359/298
See application file for complete search history.

(56) References Cited

U.S. PATENT DOCUMENTS

| | | | | |
|---|---|---|---|---|
| 10,969,675 | B1 * | 4/2021 | Wheelwright | G02B 27/0172 |
| 11,567,331 | B2 * | 1/2023 | Rubin | G02B 27/0081 |
| 11,686,943 | B2 * | 6/2023 | Park | H10K 77/111 345/8 |
| 2005/0057804 | A1 | 3/2005 | Umeya et al. | |
| 2017/0123207 | A1 | 5/2017 | Kress et al. | |
| 2018/0003862 | A1 | 1/2018 | Benitez et al. | |
| 2018/0003962 | A1 * | 1/2018 | Urey | G02B 27/0093 |
| 2019/0204600 | A1 | 7/2019 | Ha et al. | |
| 2019/0204601 | A1 | 7/2019 | Ha et al. | |
| 2021/0191122 | A1 * | 6/2021 | Yaroshchuk | G02B 6/0076 |

FOREIGN PATENT DOCUMENTS

| | | | | | |
|---|---|---|---|---|---|
| CN | 106444029 | A | | 2/2017 | |
| KR | 10-2002-0072429 | A | | 9/2002 | |
| KR | 20150026486 | A | * | 3/2015 | G06T 19/006 |
| KR | 1020150026486 | A | | 3/2015 | |
| KR | 101660519 | B1 | | 9/2016 | |
| KR | 10-2018-0028339 | A | | 3/2018 | |
| KR | 1020190063442 | A | | 6/2019 | |
| KR | 1020190117415 | A | | 10/2019 | |
| KR | 10-2020-0061043 | A | | 6/2020 | |

* cited by examiner

OPTICAL DEVICE FOR AUGMENTED REALITY USING TOTAL INTERNAL REFLECTION

TECHNICAL FIELD

The present invention relates generally to an optical device for augmented reality, and more particularly to an optical device for augmented reality that can transfer augmented reality image light by using total internal reflection inside the optical device for augmented reality, can minimize light leaking to the outside, and can prevent an optical structure from being easily recognized from the outside, thereby reducing a sense of foreignness.

BACKGROUND ART

Augmented reality (AR) refers to technology that superimposes a virtual image, provided by a computer or the like, on a real image of the real world and then provides a resulting image, as is well known.

In order to implement augmented reality, there is required an optical system that allows a virtual image, generated by a device such as a computer, to be superimposed on an image of the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a prism capable of adjusting focal length for a virtual image and a method for electrically controlling a variable focal lens in response to a change in focal length.

However, these technologies also have a problem in that a user needs to perform a separate operation in order to adjust focal length or in that hardware such as a separate processor and software for controlling focal length are required.

In order to overcome the problems of the conventional technologies, the present applicant has developed an optical device capable of implementing augmented reality by projecting a virtual image onto the retina through the pupil using a reflective unit having a size smaller than that of a human pupil, as described in the following prior art document.

FIG. 1 is a diagram showing an optical device 100 for augmented reality such as that disclosed in the prior art document.

The optical device 100 for augmented reality, which is shown in FIG. 1, includes an optical means 10, a reflective unit 20, an image output unit 30 and a frame unit 40.

The optical means 10 is a means for transmitting at least part of real object image light, which is image light output from a real object, therethrough, and may be, e.g., a lens of eyeglasses. The reflective unit 20 is embedded inside the optical means 10. Furthermore, the optical means 10 also functions to transmit the augmented reality image light, reflected by the reflective unit 20, therethrough in order to transfer the augmented reality image light to the pupil.

The frame unit 40 is a means for fixing and supporting both the image output unit 30 and the optical means 10, and may be, e.g., an eyeglass frame.

The image output unit 30 is a means for outputting augmented reality image light, which is image light corresponding to an image for augmented reality. For example, the image output unit 30 may include a small display device configured to display an image for augmented reality on a screen and to radiate augmented reality image light, and a collimator configured to collimate the image light, output from the display device, into parallel light.

The reflective unit 20 reflects image light corresponding to an image for augmented reality, output from the image output unit 30, toward a pupil of a user, thereby providing the image for augmented reality.

The reflective unit 20 shown in FIG. 1 is formed to have a size equal to or smaller than that of the average pupil of people, i.e., 8 mm or less. By forming the reflective unit 20 to be smaller than the average pupil of people as described above, the depth of field for light entering the pupil through the reflective unit 20 may be made close to almost infinite, i.e., considerably deep.

In this case, the depth of field refers to a range within which an image for augmented reality is recognized as being in focus. When the depth of field increases, this means that a focal distance for an image for augmented reality increases. Accordingly, even when a user changes the focal distance for the real world while gazing at the real world, an image for augmented reality is always recognized as being in focus regardless of such a change. This may be viewed as a kind of pinhole effect.

Accordingly, a clear virtual image may always be provided for an image for augmented reality regardless of the fact that a user changes the focal distance while gazing at a real object in the real world.

Meanwhile, the optical system used for augmented reality needs to protect user information by preventing an external observer from recognizing an image for augmented reality provided to a user who wears the optical device for augmented reality. In general, in the case of a combiner using total internal reflection, which is commonly used, an image for augmented reality is reflected on a total internal reflection surface, so that there is a limitation in that in order to protect user information, a separate coating or a shielding plate made of a translucent material needs to be installed on the front surface of the device.

In contrast, in the optical device 100 for augmented reality using the reflective unit 20 illustrated in FIG. 1, the size of the reflective unit 20 is considerably small, so that an external observer recognizes the reflective unit 20 only as a considerably small point when viewing the optical device 100 for augmented reality, with the result that the optical device 100 for augmented reality using the reflective unit 20 has the advantage of being significantly excellent in terms of the protection of user information compared to the combiner using total internal reflection. Therefore, there is a need for technology capable of preventing an external observer from easily recognizing the reflective unit 20 and also minimizing light leaking to the outside by using total internal reflection in the optical device 100 for augmented reality.

PRIOR ART DOCUMENT

Korean Patent No. 10-1660519 (published on September 29, 2016)

DISCLOSURE

Technical Problem

The present invention intends to solve the above-described problems, and an object of the present invention is to provide an optical device for augmented reality that can transfer augmented reality image light by using total internal reflection inside the optical device for augmented reality, can minimize light leaking to the outside, and can prevent an optical structure from being easily recognized from the outside, thereby reducing a sense of foreignness.

Technical Solution

In order to accomplish the above object, the present invention provides an optical device for augmented reality using total internal reflection, the optical device including: an optical means for transmitting at least part of real object image light, which is image light output from a real object, therethrough toward the pupil of an eye of a user; wherein a total internal reflection space configured to transfer augmented reality image light, output from an image output unit, toward the pupil of the eye of the user is formed inside the optical means; and wherein the total internal reflection space is filled with a medium having an index of refraction lower than the index of refraction of the optical means, and the augmented reality image light transferred to the total internal reflection space through the inside of the optical means is reflected by total internal reflection on the total internal reflection space and then transferred toward the pupil of the eye of the user.

In this case, the total internal reflection space may be formed in the internal space of the optical means where the incident angle $\theta_i$ of the augmented reality image light entering the boundary surface between the total internal reflection space and the optical means satisfies $\theta_i \geq \sin^{-1}(n_2/n_1)$ (where $n_1$ is the index of refraction of the optical means, and $n_2$ is the index of refraction of the medium filled in the total internal reflection space) based on the locations of the image output unit and the pupil.

Furthermore, the inside of the total internal reflection space may be formed as a vacuum.

Furthermore, the medium filled in the inside of the total internal reflection space may be a gas, liquid or solid having an index of refraction lower than the index of refraction of the optical means.

Furthermore, the medium filled in the total internal reflection space may be a phase-change material that changes into a crystalline phase and an amorphous phase depending on a temperature or pressure condition and thus a difference in an index of refraction occurs.

Furthermore, the total internal reflection space may be formed in a prism shape.

Furthermore, in the total internal reflection space, a diffuse reflection surface configured to diffusely reflect light may be formed on at least one of the surfaces other than the total internal reflection surface configured to reflect the augmented reality image light by total internal reflection.

Furthermore, at least one of the boundary surfaces between the total internal reflection space and the optical means may be formed as a concave or convex surface.

Furthermore, the total internal reflection space may be formed in a Fresnel lens shape.

Furthermore, the total internal reflection space may be a diffractive optical element or a holographic element.

Furthermore, at least one of the surfaces other than the total internal reflection surface of the total internal reflection space for the total internal reflection of the augmented reality image light may be coated with a blocking material that blocks light.

Furthermore, the total internal reflection space may have a size of 4 mm or less.

Furthermore, the total internal reflection space may include a plurality of total internal reflection spaces.

Advantageous Effects

According to the present invention, there can be provided the optical device for augmented reality that can transfer augmented reality image light by using total internal reflection inside the optical device for augmented reality, can minimize light leaking to the outside, and can prevent an optical structure from being easily recognized from the outside, thereby reducing a sense of foreignness.

BEST MODE

Embodiments according to the present invention will be described in detail below with reference to the accompanying drawings.

Figure 1:
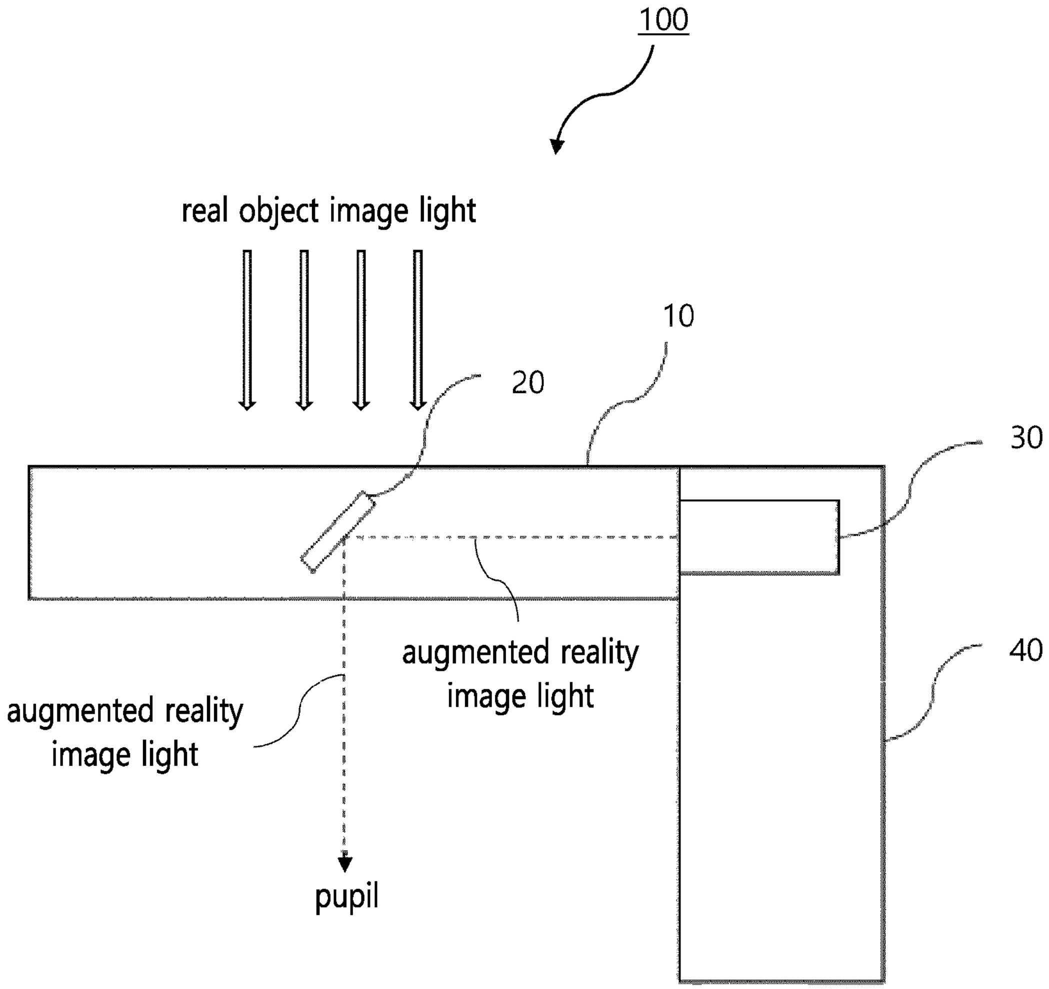
FIG. 1 is a diagram showing an optical device (100) for augmented reality such as that disclosed in the prior art literature.
Figure 2:
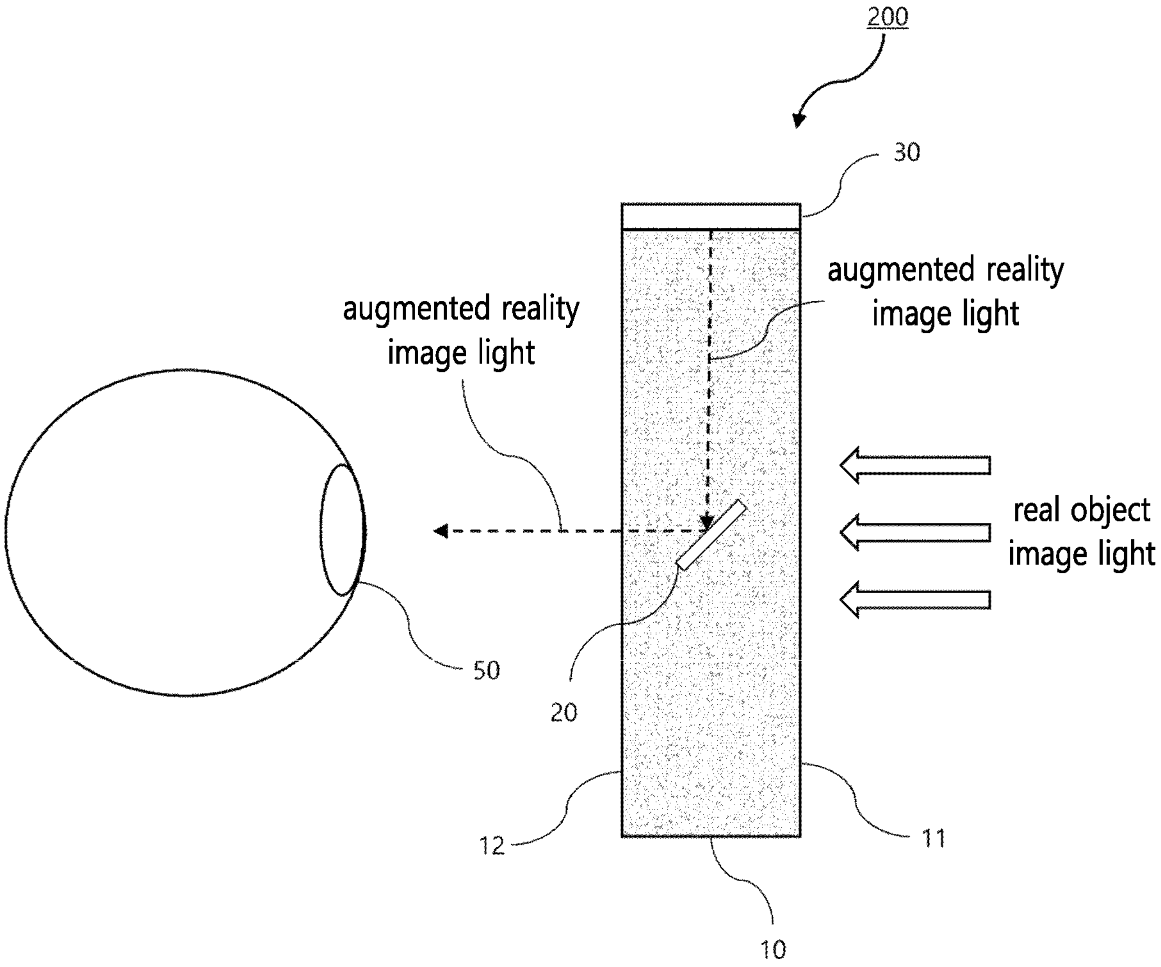
FIG. 2 is a diagram showing an optical device (200) for augmented reality using total internal reflection according to the present invention.

FIG. 2 is a diagram showing an optical device 200 for augmented reality using total internal reflection (hereinafter, simply referred to as the "optical device 200 for augmented reality") according to the present invention.

Referring to FIG. 2, the optical device 200 for augmented reality is characterized in that it includes an optical means 10 and a total internal reflection space 20 is formed inside the optical means 10.

The optical means 10 is a means for transmitting at least part of real object image light, which is the image light output from a real object, therethrough toward the pupil 50 of an eye of a user.

In this case, the fact that at least part of real object image light is transmitted toward the pupil 50 means that the light transmittance of the real object image light does not necessarily need to be 100%.

The optical means 10 may have first and second surfaces 11 and 12 that are disposed opposite to each other. The first surface 11 is a surface which the real object image light enters and the second surface 12 is a surface through which the augmented reality image light reflected by total internal reflection on the total internal reflection space 20 to be described later and the real object image light passed through the first surface 11 of the optical means 10 are output toward the pupil 50 of the eye of the user.

Although the first and second surfaces 11 and 12 of the optical means 10 are formed to be parallel to each other in the embodiment of FIG. 2, this is merely an example, and it is obvious that they may be formed not to be parallel to each other.

Further, although the augmented reality image light output from an image output unit 30 is shown as being transferred directly to the total internal reflection space 20 in the embodiment of FIG. 2, this is merely an example, and it is obvious that the augmented reality image light output from the image output unit 30 may be reflected at least once by total internal reflection on at least one of the first and second surfaces 11 and 12 of the optical means 10 and then transferred to the total internal reflection space 20.

The image output unit 30 is a means for outputting augmented reality image light corresponding to an image for augmented reality. For example, the image output unit 30 may be a display device such as a small LCD or OLED or an LCOS including lighting, and may further include a refractive means such as a collimator for outputting collimated light, a reflective means, a diffractive means, and/or the like.

Since the image output unit 30 itself is not a direct target of the present invention and is known by prior art, a detailed description thereof will be omitted below.

Meanwhile, the image for augmented reality refers to a virtual image output from the image output unit 30 and transferred to the pupil 50 of the user through the optical device 200 for augmented reality. For example, the image for augmented reality may be a still image or moving image.

Such an image for augmented reality is output from the image output unit 30 and transferred to the pupil 50 of the user through the optical device 200 for augmented reality, thereby being provided to the user as a virtual image. At the same time, the user receives the real object image light output from a real object present in the real world through the optical means 10. Accordingly, the user may be provided with an augmented reality service.

The total internal reflection space 20 is a means for transferring the augmented reality image light, output from the image output unit 30, toward the pupil 50 of the eye of the user and is formed in the shape of an empty space inside the optical means 10.

The total internal reflection space 20 is formed at an appropriate location inside the optical means 10 by considering the locations of the image output unit 10 and the pupil 50 so that when the augmented reality optical device 200 is positioned in front of the pupil 50 of the user, the augmented reality image light incident into the total internal reflection space 20 can be transferred to the pupil 50 of the user.

In other words, the total internal reflection space 20 is formed inside the optical means 10 so that the augmented reality image light output from the image output unit 30 and entering the total internal reflection space 20 through the inside of the optical means 10 can be transferred to the pupil 50 by total internal reflection.

Furthermore, the total internal reflection space 20 is characterized in that it is filled with a medium having an index of refraction lower than the index of refraction of the optical means 10 in order to reflect incident augmented reality image light by total internal reflection thereon.

Figure 3:
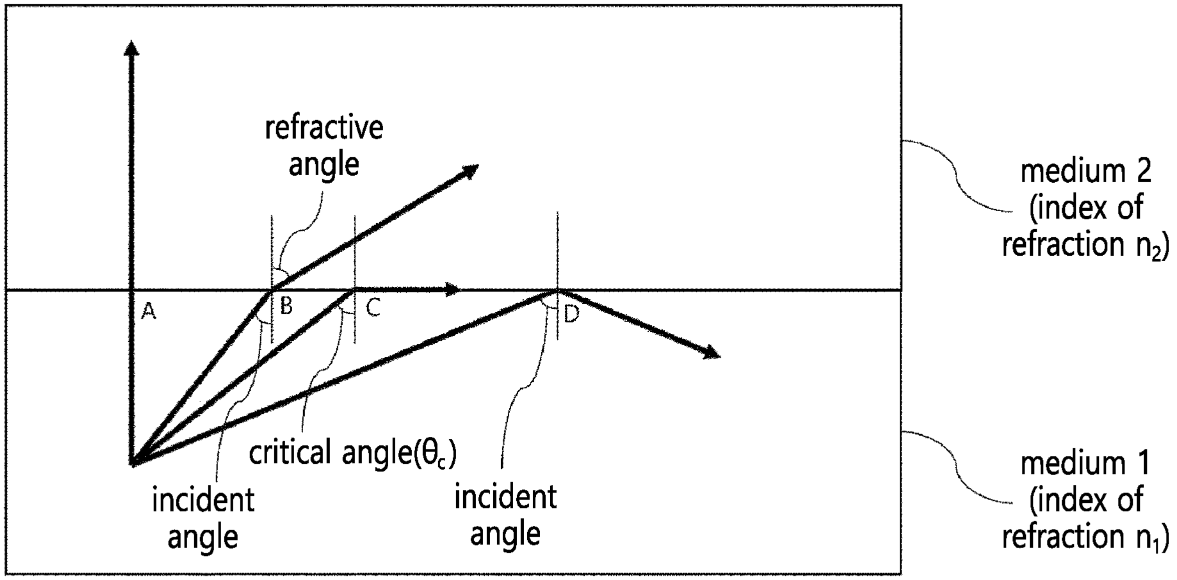
FIG. 3 is a view illustrating the principle of total internal reflection.

FIG. 3 is a view illustrating the principle of total internal reflection.

As is known, when light travels from a medium having a high index of refraction to a medium having a low index of refraction, part thereof is transmitted through the boundary surface between the media and part thereof is reflected on the boundary surface between the media. In the case where the incident angle increases, when the angle exceeds a specific value, there occurs a phenomenon in which all of the light is reflected on the boundary surface. This phenomenon is called "total internal reflection" and the incident angle at this time is called a "critical angle".

In FIG. 3, the index of refraction of medium 1 is referred to as $n_1$, and the index of refraction of medium 2 is referred to as $n_2$. Also, it is assumed that the index of refraction $n_1$ of the medium 1 has a higher value than the index of refraction $n_2$ of the medium 2.

Referring to FIG. 3, it can be seen that in the case of rays of light A and B traveling from medium 1 to medium 2, part thereof is reflected on the boundary surface and part thereof pass through the boundary surface, but in the case of a ray of light C, there is no ray of light transmitted into medium 2. The incident angle in this case is a critical angle $\theta_c$. It can be seen that since the incident angle of a ray of light D is larger than the critical angle, the ray of light D is all reflected on the boundary surface and then travels toward medium 1.

The critical angle $\theta_c$ may be obtained by the following equation.

In the case of the ray of light *C*, $n_1 \cdot \sin \theta_c = n_2 \cdot \sin 90°$ and $\sin 90° = 1$, so that $\sin \theta_c = n_2/n_1$ and $\theta_c = \sin^{-1}(n_2/n_1)$.

Accordingly, in order for total internal reflection to occur, the incident angle needs to be equal to or larger than the critical angle $\theta_c$ $(=\sin^{-1}(n_2/n_1))$.

Figure 4:
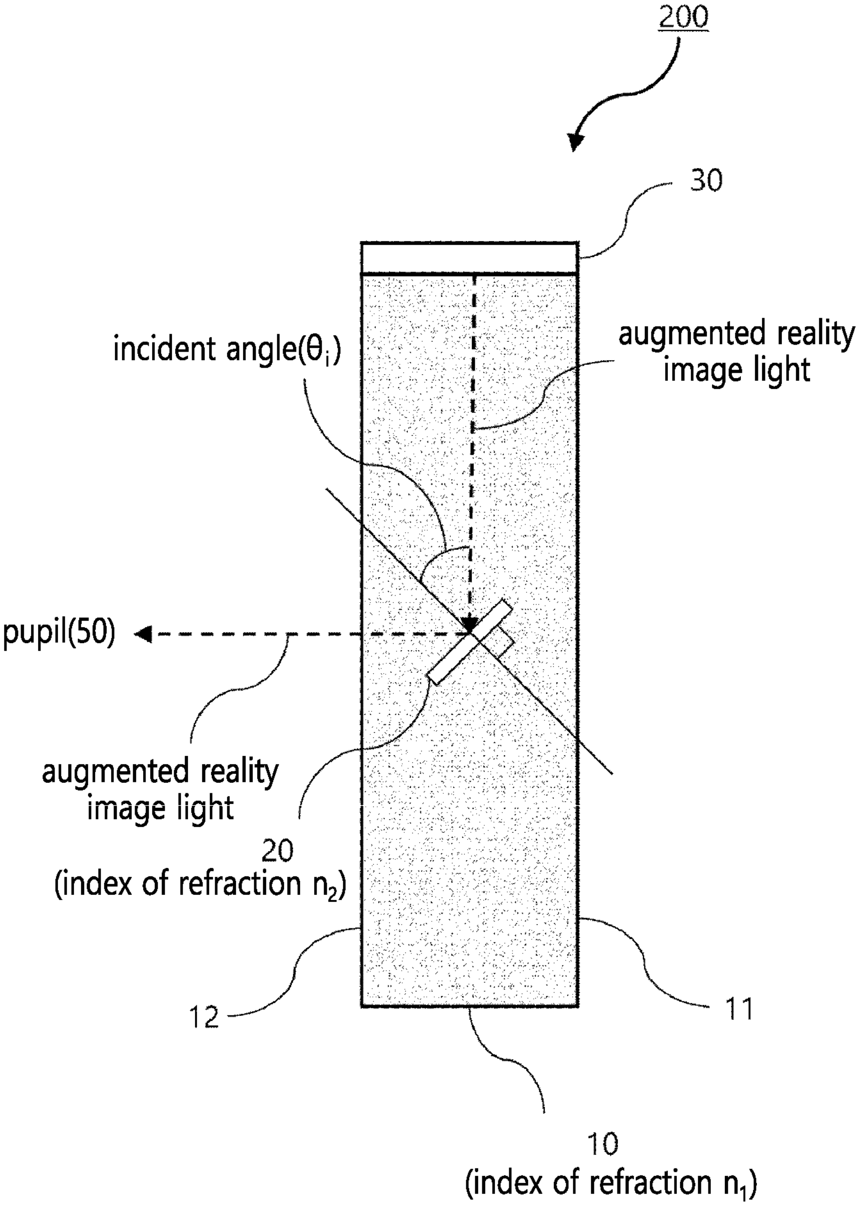
FIG. 4 is intended to illustrate the arrangement structure of a total internal reflection space (20) according to the present invention based on the principle of total internal reflection illustrated in FIG. 3.

FIG. 4 is intended to illustrate the arrangement structure of the total internal reflection space 20 according to the present invention based on the principle of total internal reflection illustrated in FIG. 3.

Referring to 4, in order for the augmented reality image light output from the image output unit 30 and propagating through the inside of the optical means 10 to be reflected by total internal reflection on the boundary surface between the total internal reflection space 20 and the optical means 10 when the index of refraction of the optical means 10 is $n_1$ and the index of refraction of the medium filled in the total internal reflection space 20 is $n_2$ $(n_1 > n_2)$, the incident angle $\theta_i$ of the augmented reality image light entering the boundary surface between the total internal reflection space 20 and the optical means 10 needs to have a value equal to or larger than the critical angle $\theta_c$.

As described above, since $\theta_c = \sin^{-1}(n_2/n_1)$, the total internal reflection space 20 needs to be formed in the internal space of the optical means 10 satisfying $\theta_i \sin^{-1}(n_2/n_1)$ based on the locations of the image output unit 30 and the pupil 50.

Furthermore, in order for the augmented reality image light output from the image output unit 30 and traveling through the inside of the optical means 10 to be reflected by total internal refection on the boundary surface between the total internal reflection space 20 and the optical means 10, the index of refraction $n_2$ of the medium filled in the total internal reflection space 20 needs to be lower than the index of refraction $n_1$ of the optical means 10 (since $n_1 > n_2$), and thus the total internal reflection space 20 is filled with a medium having an index of refraction lower than the index of refraction $n_1$ of the optical means 10.

For example, when the optical means 10 is made of a glass or plastic material, the index of refraction $n_1$ is about 1.5, so that the index of refraction $n_2$ of the medium filled in the total internal reflection space 20 needs to have a lower value than the above index of refraction.

Since the index of refraction of vacuum is 1, the inside of the total internal reflection space 20 may be formed as a vacuum. In this case, the medium filled in the total internal reflection space 20 may be viewed as a vacuum.

Furthermore, since air has an index of refraction of about 1.0003, the total internal reflection space 20 may be filled with air. Alternatively, since a gas other than air usually has an index of refraction close to 1, another gas having an index of refraction lower than the index of refraction $n_i$ of the optical means 10 may be used as the medium that fills the inside of the total internal reflection space 20.

Furthermore, since water has an index of refraction of about 1.33, the inside of the total internal reflection space 20 may be filled with water. Alternatively, another liquid having an index of refraction lower than the index of refraction $n_1$ of the optical means 10 may be used as the medium that fills the inside of the total internal reflection space 20.

Furthermore, another solid having an index of refraction lower than the index of refraction $n_1$ of the optical means 10 may be used as the medium that fills the inside of the total internal reflection space 20.

In addition, any other various low-refractive media having an index of refraction lower than the index of refraction $n_1$ of the optical means 10 may be used as the medium that fills the inside of the optical means 10.

Meanwhile, the inside of the total internal reflection space 20 may be filled with a phase-change material.

The phase-change material is a material used in hologram memory, an optical storage device, and the like, and has a characteristic in which the index of refraction thereof changes depending on a condition such as temperature or pressure in the process of performing crystallization after applying energy.

Representative materials used in optical storage devices include $Sb_2Se_3$, $Ge_2Sb_2Te_5$, and TeOx (0<x<2) that are represented by GeSbTe (GST). After heating to a high temperature using a laser, these materials change into an amorphous phase when cooled rapidly or into a crystalline phase when cooled slowly. In this case, a difference in the index of refraction occurs between the crystalline phase and the amorphous phase.

Representative materials used in hologram memory and the like include acrylate-based copolymers, and the index of refraction thereof is changed by exposure through a laser.

In the present invention, augmented reality image light may be made to be reflected by total internal reflection at the total internal reflection space 20 due to a difference in the index of refraction between the phase-change material and the optical means 10 by filling the space, where the total internal reflection space 20 is formed, with the phase-change material as a medium and also using a change in the index of refraction attributable to a condition of the phase-change material.

The medium filled in the total internal reflection space 20 is preferably made of a transparent or translucent material.

Figure 5:
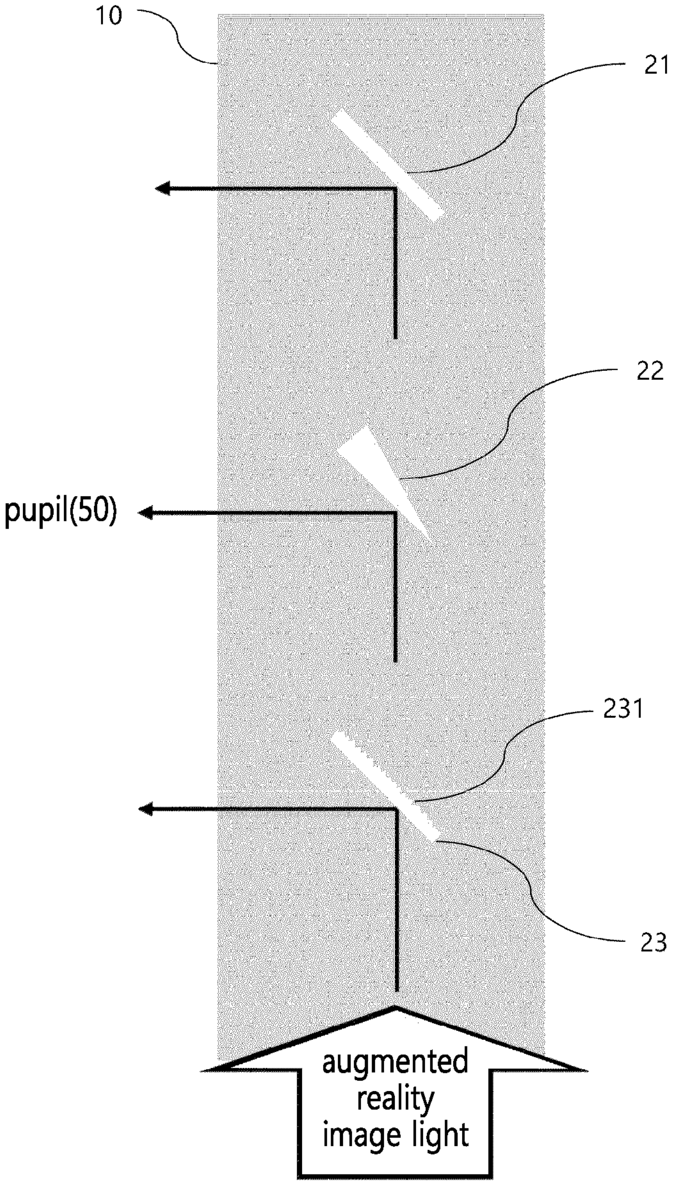
FIG. 5 is a diagram illustrating various shapes of the total internal reflection space (20)

FIG. 5 is a diagram illustrating various shapes of the total internal reflection space 20.

Referring to FIG. 5, the total internal reflection space 20 is illustrated as having three shapes 21, 22, and 23.

The first type of total internal reflection space 21 is formed to have a thin plate shape when the optical means 10 is viewed from the side.

The second type of total internal reflection space 22 is formed to have a triangular shape when the optical means 10 is viewed from the side, and is formed to have a prism shape when it is viewed as a whole. The prism-shaped total internal reflection space 22 has an advantage in that it is difficult for an external observer to recognize the total internal reflection space 22 because real object image light is refracted or reflected at a larger angle through the total internal reflection space 22 in the shape of a prism when viewed from the viewpoint of the external observer, and thus the possibility that the real object image light is transferred to the external observer is reduced.

The third type of total internal reflection space 23 is formed to have a thin plate shape when the optical means 10 is viewed from the side, and is characterized in that a diffuse reflection surface 231 configured to diffusely reflect light is formed on at least one of the surfaces other than a total internal reflection surface on which augmented reality image light is incident and reflected by total internal reflection.

The outer surface 231 of the total internal reflection space 23 in FIG. 5 is provided with a plurality of sawtooth-shaped protrusions and acts as a diffuse reflection surface. According to this configuration, there is an advantage in that it is difficult for an external observer to recognize the total internal reflection space 22 because the outer surface 231 of the total internal reflection space 23 acts as a diffuse reflection surface for real object image light.

Meanwhile, although not shown in the drawings, at least one of the boundary surfaces between the total internal reflection space 20 and the optical means 10 may be formed as a concave or convex surface, and thus a lens shape may be formed as a whole. In this case, any one surface may be formed as a flat surface, and at least one of other surfaces may be formed as a concave or convex surface. When the total internal reflection space 23 is formed in the shape of a lens as described above, there is an advantage in that it is difficult to recognize the total internal reflection space 20 from the outside due to the diverging or converging effect of the lens.

Furthermore, the total internal reflection space 20 may be formed to have the shape of a Fresnel lens.

Figure 6:
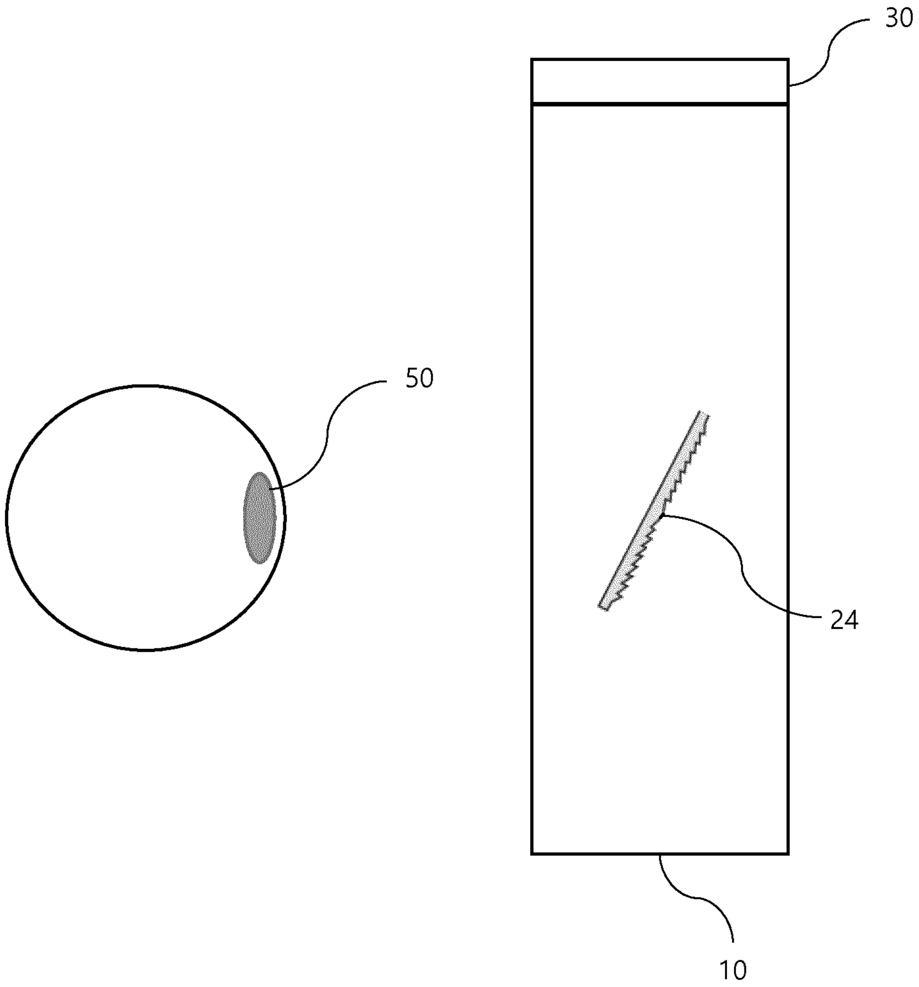
FIG. 6 is a diagram illustrating a total internal reflection space (24) formed in the shape of a Fresnel lens.

FIG. 6 is a diagram illustrating a total internal reflection space 24 formed in the shape of a Fresnel lens.

As is well known, a Fresnel lens is an optical component composed of successive concentric grooves etched onto plastic, and has thin and light features. A Fresnel lens has the effect of achieving the same characteristics as a thick lens even with a thin thickness by replacing the curved surface of a conventional optical lens with concentric grooves having the same curvature.

When the surface opposite to the total internal reflection surface of the total internal reflection space 24 is formed as a surface having a curvature by using the principle of a Fresnel lens, the effect of total internal reflection is obtained through the total internal reflection surface, and the effect in which it is difficult to observe the total internal reflection space 24 from the outside because the surface having a curvature acts as a Fresnel lens. Furthermore, the thickness of the Fresnel lens is small, and thus an advantage is provided in that it is difficult to observe the total internal reflection space 24 from the outside.

Figure 7:
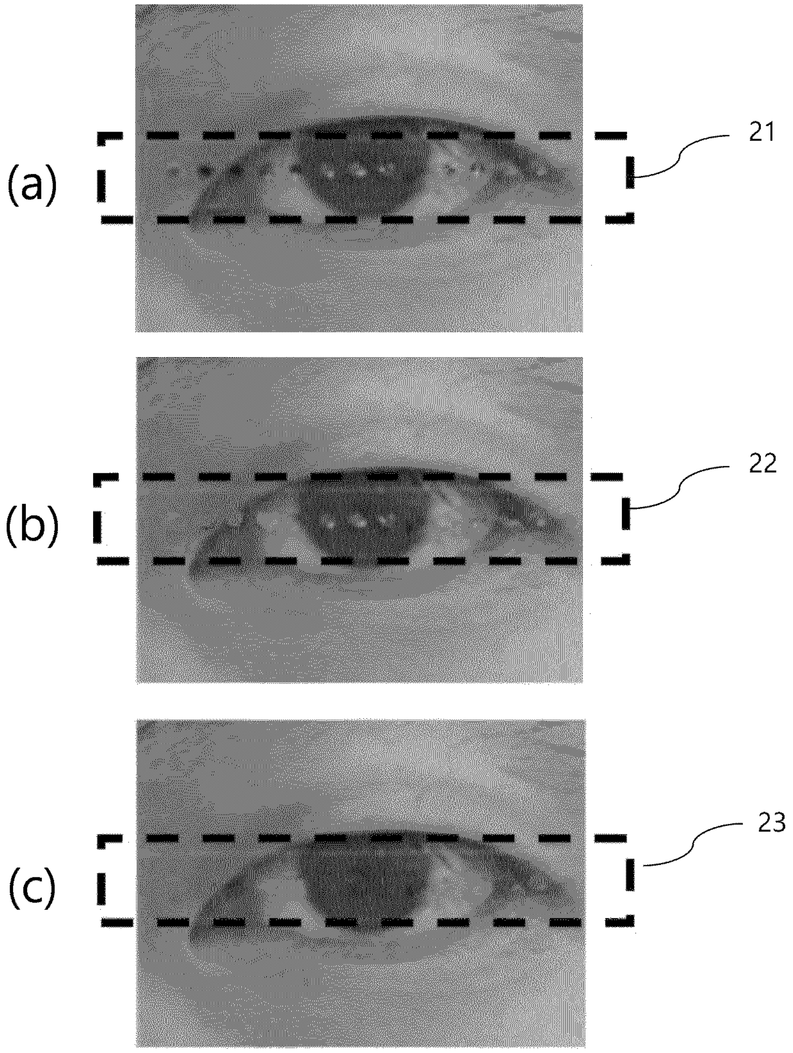
FIG. 7 shows photographs illustrating the shapes of total internal reflection spaces (20) that are observed from the outside.

FIG. 7 shows photographs illustrating the shapes of total internal reflection spaces 20 that are observed from the outside.

FIG. 7(*a*) shows the first type of total internal reflection space 21 of FIG. 5 when observed from the outside, FIG. 7(*b*) shows the second type of total internal reflection space 22 of FIG. 5 when observed from the outside, and FIG. 7(*c*) shows the third type of total internal reflection space 23 of FIG. 5 when observed from the outside.

Referring to FIG. 7, it can be seen that the second type of total internal reflection space 22 is less visible from the outside than the first type of total internal reflection space 21 and the third type of total internal reflection space 23 is less visible than the second type of total internal reflection space 22 and, thus, is hardly recognized from the outside.

Although not shown in the drawings, the total internal reflection space 24 having a Fresnel lens shape shown in FIG. 6 appears similar to that of FIG. 7(*c*).

Meanwhile, the total internal reflection space 20 according to the present invention may be formed as a diffractive optical element (DOE) or a holographic optical element (HOE) other than the above shape.

Furthermore, at least one of the surfaces other than the total internal reflection surface of the total internal reflection space 20 configured to reflect augmented reality image light by total internal reflection may be coated with a light blocking material.

Meanwhile, the total internal reflection space 20 is formed to have a size smaller than the size of a human pupil, i.e., 8 mm or less, more preferably 4 mm or less, in order to obtain a pinhole effect by increasing the depth of field, as described in the background art section.

By forming the total internal reflection space 20 to be smaller than the size of the average pupil of people, the depth of field for light entering the pupil 50 through the total internal reflection space 20 may be made almost infinite, i.e., considerably deep, so that there may be achieved a pinhole effect in which even when a user changes the focal distance for the real world while gazing at the real world, an image for augmented reality is always recognized as being in focus regardless of such a change.

In this case, the size of the total internal reflection space 20 refers to the maximum length between any two points on the edge boundary of the total internal reflection space 20.

Furthermore, the size of the total internal reflection space 20 may be the maximum length between any two points on the edge boundary of the orthogonal projection of the total internal reflection space 20 projected onto any plane including the center of the pupil 50 while being perpendicular to a straight line between the pupil 50 and the total internal reflection space 20.

Meanwhile, although only one total internal reflection space 20 is shown in the above-described embodiment, it is obvious that a plurality of total internal reflection spaces may be formed.

In this case, the sizes of the plurality of total internal reflection spaces 20 do not necessarily need to be the same, and may be partially different from each other.

Furthermore, although it is preferable that the plurality of total internal reflection spaces 20 be disposed at the same intervals, at least some of the total internal reflection spaces 20 may be disposed at different intervals than other total internal reflection spaces 20.

Moreover, the angle of inclination of at least some of the plurality of total internal reflection spaces 20 with respect to the optical means 10 may be formed to be different from the angle of inclination of other total internal reflection spaces 31 to 35.

While the configuration of the present invention has been described above with reference to the preferred embodiments of the present invention, it is obvious that the present invention is not limited to the above-described embodiments, but various modifications and alterations may be possible within the scope of the present invention.

The invention claimed is:

1. An optical device for augmented reality using total internal reflection, the optical device comprising:

an optical means for transmitting at least part of real object image light which is image light output from a real object, therethrough toward a pupil of an eye of a user;

wherein a total internal reflection space configured to transfer augmented reality image light output from an image output unit toward the pupil of the eye of the user is formed in a shape of an empty space inside the optical means;

wherein the total internal reflection space is formed spaced apart from an inner surface of the optical means and has a size of 4 mm or less;

wherein the size of the total internal reflection space is a maximum length between any two points on an edge boundary of the total internal reflection space;

wherein the optical means has a first surface and a second surface that are disposed opposite to each other, wherein the first surface is a surface which the real object image light enters and the second surface is a surface through which the augmented reality image light reflected by total internal reflection on the total internal reflection space and the real object image light passed through the first surface of the optical means are output toward the pupil of the eye of the user;

wherein the total internal reflection space is formed inside the optical means and spaced apart from the first surface and the second surface;

wherein the total internal reflection space is filled with a medium having an index of refraction lower than an index of refraction of the optical means; and wherein the total internal reflection space is formed so that the augmented reality image light transferred to the total internal reflection space through an inside of the optical means is allowed to be reflected by total internal reflection on a boundary surface between the total internal reflection space and the optical means and then transferred toward the pupil of the eye of the user.

2. The optical device of claim 1, wherein the total internal reflection space is formed in an internal space of the optical means where an incident angle $\theta_i$ of the augmented reality image light entering the boundary surface between the total internal reflection space and the optical means satisfies $\theta_i \geq \sin^{-1}(n_2/n_1)$ (where $n_1$ is the index of refraction of the optical means, and $n_2$ is the index of refraction of the medium filled in the total internal reflection space) based on locations of the image output unit and the pupil.

3. The optical device of claim 1, wherein an inside of the total internal reflection space is formed as a vacuum.

4. The optical device of claim 1, wherein the medium filled in an inside of the total internal reflection space is a gas, liquid or solid having an index of refraction lower than the index of refraction of the optical means.

5. The optical device of claim 1, wherein the medium filled in the total internal reflection space is a phase-change material that changes into a crystalline phase and an amorphous phase depending on a temperature or pressure condition and thus a difference in an index of refraction occurs.

6. The optical device of claim 1, wherein the total internal reflection space is formed in a prism shape.

7. The optical device of claim 1, wherein in the total internal reflection space, a diffuse reflection surface configured to diffusely reflect light is formed on at least one of surfaces other than a total internal reflection surface configured to reflect the augmented reality image light by total internal reflection.

8. The optical device of claim 1, wherein at least one of boundary surfaces between the total internal reflection space and the optical means is formed as a concave or convex surface.

9. The optical device of claim 1, wherein the total internal reflection space is formed in a Fresnel lens shape.

10. The optical device of claim 1, wherein the total internal reflection space is a diffractive optical element or a holographic element.

11. The optical device of claim 1, wherein at least one of surfaces other than a total internal reflection surface of the total internal reflection space for total internal reflection of the augmented reality image light is coated with a blocking material that blocks light.

12. The optical device of claim 1, wherein the total internal reflection space includes a plurality of total internal reflection spaces.

* * * * *